(12) United States Patent
Thoma et al.

(10) Patent No.: US 6,231,466 B1
(45) Date of Patent: May 15, 2001

(54) HYDROSTATIC TRANSAXLE

(75) Inventors: Christian Helmut Thoma; George Duncan McRae Arnold, both of Jersey (GB)

(73) Assignee: Unipat AG, Glarus (CH)

( * ) Notice: Subject to any disclaimer, the term of this patent is extended or adjusted under 35 U.S.C. 154(b) by 0 days.

(21) Appl. No.: 09/440,940

(22) Filed: Nov. 16, 1999

Related U.S. Application Data

(60) Provisional application No. 60/108,542, filed on Nov. 16, 1998.

(51) Int. Cl.$^7$ .......................... F16H 47/04; F16H 57/02; F16H 57/04
(52) U.S. Cl. ........................ 475/83; 74/606 R; 74/487; 74/456
(58) Field of Search ................ 475/83; 74/606 R; 180/305, 307; 60/456, 487

(56) References Cited

U.S. PATENT DOCUMENTS

| | | | |
|---|---|---|---|
| 4,856,368 | * 8/1989 | Fujisaki et al. | 475/83 X |
| 4,870,820 | * 10/1989 | Nemoto | 475/83 X |
| 4,893,524 | * 1/1990 | Ohashi et al. | 475/83 |
| 4,899,541 | * 2/1990 | Okada et al. | 60/487 X |
| 4,942,780 | * 7/1990 | Fujisaki et al. | 475/83 |
| 5,078,659 | 1/1992 | von Kaler et al. | 475/78 |
| 5,090,949 | 2/1992 | Thoma et al. | 475/83 |
| 5,163,293 | 11/1992 | Azuma et al. | 60/487 |
| 5,203,169 | * 4/1993 | Ishii et al. | 60/487 |
| 5,230,519 | 7/1993 | Nishimura et al. | 475/83 |
| 5,392,603 | 2/1995 | Havens et al. | 60/327 |
| 5,392,670 | 2/1995 | Hauser et al. | 475/83 |
| 5,473,964 | 12/1995 | Okada et al. | 74/606 R |
| 5,501,640 | 3/1996 | Hauser et al. | 475/83 |
| 5,636,555 | 6/1997 | Okada et al. | 74/606 R |
| 5,771,758 | 6/1998 | Hauser | 74/606 R |
| 5,799,486 | 9/1998 | Takada et al. | 60/464 |
| 5,809,845 | 9/1998 | Shimizu | 74/606 R |
| 5,819,537 | 10/1998 | Okada et al. | 60/487 |

* cited by examiner

*Primary Examiner*—Charles A Marmor
*Assistant Examiner*—Ankur Parekh
(74) *Attorney, Agent, or Firm*—Young & Thompson

(57) ABSTRACT

A hydrostatic transaxle axle assembly for a vehicle such as a grass mowing lawn or garden tractor comprising a lly disposed hydrostatic transmission having a variable-displacement hydraulic pump fluidly connected to a fixed-displacement hydraulic motor, the hhousing for an internay-draulic motor being connected by differential gearing to axle shafts supported in the housing. The housing is formed by at least three housing members, two of which are separable on a first parting-plane arranged to be perpendicular with respect to the longitudinal axes of the axle shafts. One or two of the housing members being provided with an opening to allow a portion of another housing members, called the radiator member portion to extend through, and where the extending portion contains within its internal structure a number of fluid power transmitting passages arranged for the purpose of fluidly connecting the hydraulic pump with the hydraulic motor. This construction allows for improved cooling of the power transmitting fluid flowing between the pump and motor which, in the prior art, is difficult because the equivalent center section member carrying such passages is located within the axle assembly and is not exposed to an exterior surface over which cooling air from a fan driven input drive-shaft can pass.

30 Claims, 6 Drawing Sheets

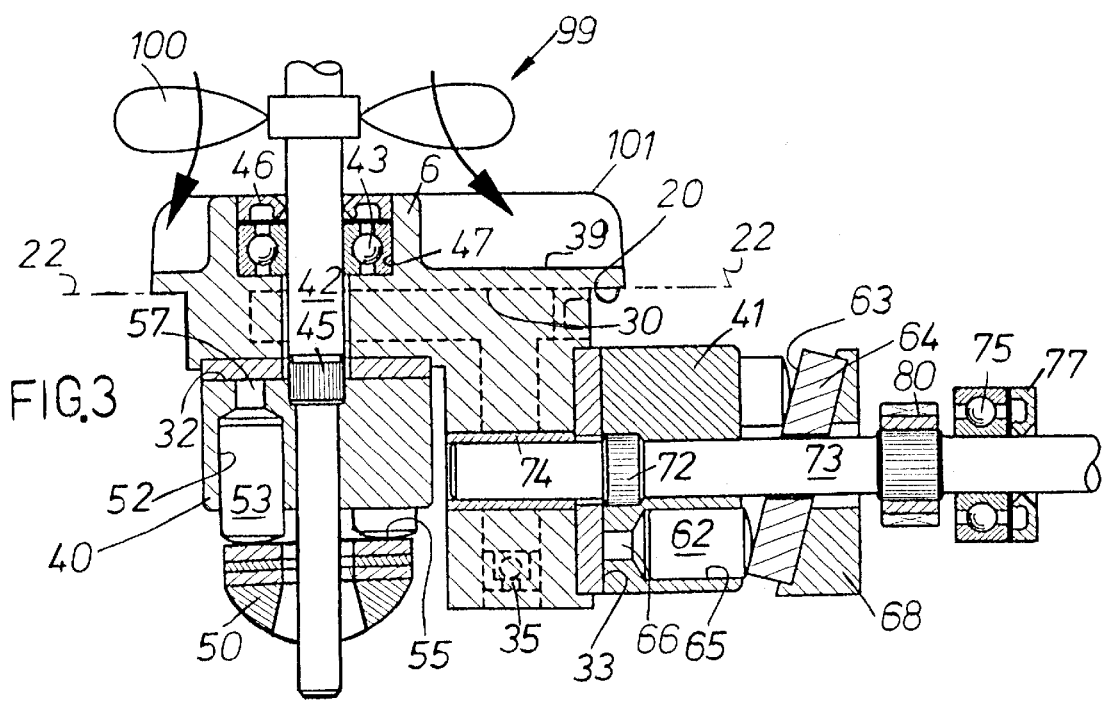
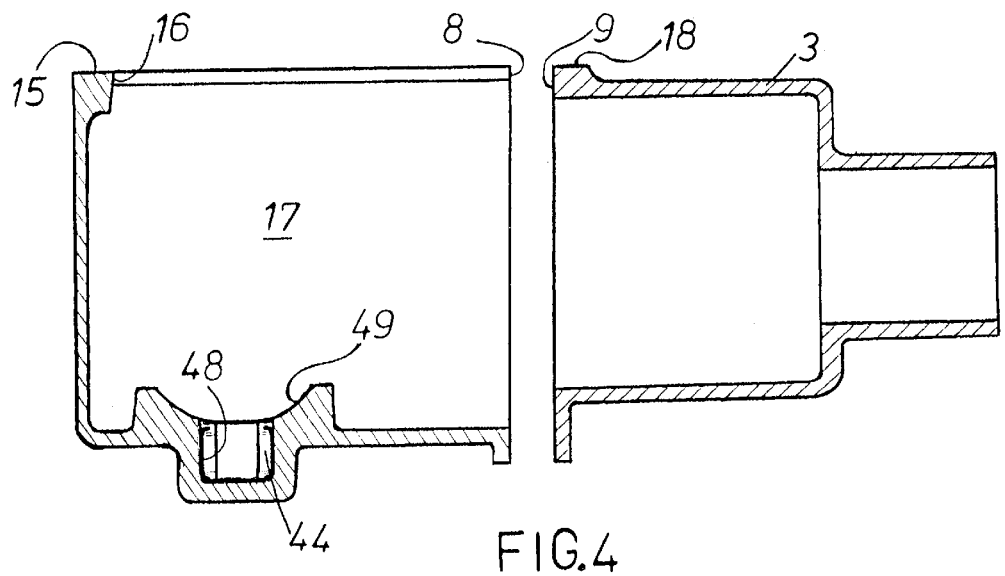

HYDROSTATIC TRANSAXLE

CROSS REFERENCE TO RELATED APPLICATION

This application claims the benefit under 35 U.S.C. 119(e) of provisional application No. 60/108,542 filed Nov. 16, 1998.

FIELD OF THE INVENTION

This invention relates to hydrostatic transaxle assemblies for use in small vehicles such as lawn tractors, and more particularly, to a compact, fully integrated hydrostatic transaxle incorporating a hydrostatic transmission employing a variable capacity pump and fixed capacity motor. It is common to find that the type of hydraulic pump and motor frequently used is the axial piston swash-plate design. As a result, hydrostatic-transmissions in association with transaxle driving apparatus have proven to be very useful to-date and are used in numerous applications such as small vehicles like self-propelled grass-mowing lawn tractors.

BACKGROUND OF THE INVENTION

Hydrostatically powered driven equipment such as lawn tractors have become extremely popular and many utilise the axial piston swash-plate configuration for the pump and motor elements of the hydrostatic transmission. Such tractors generally have an internal combustion engine having a vertical crankshaft which is connected to the transaxle power input by means of a conventional belt and pulley arrangement whereby engine power is transmitted by the belt to an input drive shaft supported in the transaxle housing. The input shaft is operatively connected to the pump to cause the pump to rotate at high speed as shown in U.S. Pat. Nos. 5,090,949 and 5,771,758 both of which are incorporated herewith as reference. In these particular examples of integrated hydrostatic transaxle apparatus, the axial piston swash-plate pump is fluidly coupled to the fixed-displacement axial piston motor by means of a valve member, most often referred to as a center section, and where the center section is internally disposed within a chamber formed by surrounding housing of the hydrostatic transaxle and fixedly attached in some manner to the housing. The chamber serves as the fluid reservoir for the hydrostatic transmission whereby the rotating elements of the pump and motor as well as other elements such as the center section remain fully immersed in the power transmission fluid contained within the chamber.

The cylinder-barrel of the pump, being operatively connected to the input drive shaft, rotates at high speed and when the variable angle swash-plate is inclined with respect to the rotational axis of the cylinder-barrel, axial sliding motion of the pistons occurs within their respective cylinders causing fluid to be displaced within said cylinders. The fluid flow thus created by the reciprocating axial motion of the pistons is channeled via porting and passages in the center section to the hydraulic motor, with the effect that the incoming fluid causes the pistons of the motor to reciprocate and create a turning moment that causes rotation of the hydraulic motor. The hydraulic motor in turn has an output shaft which drives the vehicle's axles through speed-reducing gears and a mechanical differential.

The center section provides support surfaces for the pump and motor as well as providing within its interior structure the necessary fluid link in the form of passages so that hydraulic power can be transmitted between the pump and motor. The center-section as shown in these references require extensive machining operations in order to convert the initial raw casting into the ready to be used component. Apart from machining some of the internal passages and fixing points, the external faces on which the cylinder-barrels of the pump and motor operate against must also be prepared. Internal valves are fitted in some of these machined passages, for instance, fluid make-up check-valves, and the center-section must be designed so that it can be readily assembled and attached to interior wall structure of the transaxle housing. Mounting surfaces in the transaxle housing interior must also be machining in preparation for the attaching and fixing on the center section. The housing furthermore, requires a number of other machining operations, for instance finish sizing in the raw casting of the various apertures and holes for bearings and seals required for the drive shaft and speed control mechanism. In general terms, the more components requiring machining, the most costly the manufacture of the transaxle. Therefore there would be savings if many or all of the above referred to machining operations could be grouped into a single component, preferably in that component containing the fluid passages as well as the bearings and seals for the drive-shaft and speed control mechanism, and there would be an attendant saving in assembly as components such as shafts, valves would be first assembled in a sub-assembly.

Although only shown in the '949 patent, almost all hydrostatic transaxles make use of a cooling fan mounted to the input drive shaft in an attempt to help prevent the internal components and fluid from overheating. However, the prior art teaches a center section which although attached in some manner to the interior of the housing, it is still essentially a separate entity from the transaxle housing. As a result, effective cooling of the fluid passing through the passages in the center section that connect the pump and motor together is hindered as the fluid surrounding the center section acts as a insulating medium to slow down the rate of heat transfer from the power transmitted fluid in said passages to the surrounding housing radiator.

The amount of heat able to be radiated away from the transaxle housing exterior to the surrounding environment is of course greatly enhanced over that region on the boundary of the transaxle housing that lies directly in the path of the air flow from the cooling fan. However, it is apparent that although the fluid inside the housing nearest that region where the fan is operating is being cooled, fluid elsewhere may still remain at very high temperature. Perhaps more importantly, as the fluid circulating between the pump and motor in the fluid passages in the center section becomes extremely hot during operation, especially when the unit is heavily loaded and used in a high ambient temperature environment, the resulting drop of operating efficiency due to decreasing fluid viscosity and a corresponding increase in fluid leakage losses can be a concern with the prior art.

This problem exists because the attendant power losses associated with such close coupled pump and motor combinations produce a lot of unwanted heat due to the rapid fluid compression/decompression cycles and general friction between the sliding surfaces. Such losses causes the fluid circulating between the pump and motor through the center section to become extremely host, and because the prior art teaches a transaxle housing structure whereby the internal fluid reservoir completely or almost completely surrounds and insulates the center section, these prior solutions are not conductive to the promotion of most effective cooling for the circulating fluid in the centre section flowing in a closed-loop circuit between the pump and motor. This limitation occurs because the bulk of the heat accumulating in the center section can only be transferred by conduction to the surrounding hydraulic fluid and then through the fluid itself to reach the boundary walls of the housing surrounding the fluid chamber from where it can be radiated away to the surroundings. The remove of unwanted heat from the center section consequently takes time.

Therefore in these prior devices where the center section is effectively insulated by the surrounding hydraulic fluid medium, the delay in the transfer of unwanted heat out of the transaxle may on occasion result in the fluid of the hydrostatic transmission becoming overheated with the risk that the operational life of the fluid is shortened or that the lubricating properties of the fluid deteriorates to the extent that threatens the useful operational life of the hydrostatic transaxle.

SUMMARY OF THE INVENTION

An object of the invention is to eliminate the need to use a conventional center section in a hydrostatic transaxle product. A further object of the invention is to provide an improved hydrostatic transaxle assembly in which a portion of the component carrying the fluid passages for connecting the pump to the motor is exposed to the exterior of the axle assembly.

It is a further object of the invention to broaden the operational performance envelop of the hydrostatic transaxle by improving the heat dissipating characteristics of its surrounding housing structure. By enhancing the heat dissipating properties of the housing structure in order to increase the amount of heat able to be radiated away from fluid passages connecting the pump and motor of the hydrostatic transmission, the more durable the product becomes and the longer the product can perform under arduous conditions. Whereas prior art devices have center sections that are effectively insulated by the surrounding fluid medium on all sides impairing the rapid disposal of heat so that they can only rely on the housing radiating away sufficient heat from the fluid in the chamber surrounding the hydrostatic transmission, the present invention, with a portion of its fluid passages in close proximity to the exterior of the housing, can in addition extract far greater quantities of unwanted heat more directly away from the power transmitting fluid flowing in the circuit between the pump and motor.

Through the positioning of the fluid passages close in proximity to the exterior of the housing directly under the air flow from the fan, fan cooling of the housing can become extremely effective in lowering the temperature of the hydrostatic transmission fluid circulating in the closed-loop flow circuit path between the pump and motor as much as the heat of the power transmission fluid can be conducted directly into the material of the housing containing the fluid passage, a portion of which lies directly under or very new to the path of air flow from the shaft driven cooling fan. As a result, there is less likelihood in the fluid of the hydrostatic transmission being over heated with the resulting associated risks that the operational life of the fluid is shortened or that the lubricating properties of the fluid deteriorates to the extent that threatens the useful operational life of the hydrostatic transaxle.

Another object of the present invention is to group as many as possible machining operations in the component containing the fluid passages for the saving of manufacturing expense as well as simplifying the assembly of the hydrostatic transaxle product.

What is therefore needed in the art is a compact, inexpensive hydrostatic transaxle axle assembly with improved cooling thereby effectively increasing the operation duty cycle and improving the performance of the hydrostatic transmission by maintaining higher and more optimum oil viscosity.

In one form thereof, the hydrostatic transaxle of the intention comprises an axle assembly with a housing having an internal chamber for an internally disposed hydrostatic transmission, the hydrostatic transmission comprising a variable-displacement hydraulic pump and a fixed-displacement hydraulic motor; speed reducing gearing in the housing and drivingly connected to the hydraulic motor; axle shafts rotatably supported in the housing and a mechanical differential disposed within the housing, the differential drivingly connected between the speed reducing gearing and the axle shafts; the housing comprising first and second case portions joined together along a first parting-plane disposed perpendicular to the longitudinal axes of the axle shafts and a radiator member portion connectable about an opening provided in at least one of the first and second case portions along a second parting-plane disposed parallel and offset with respect to the longitudinal axes of the axle shafts; the radiator member portion containing within its internal structure fluid power transmitting passages for connecting the hydraulic pump and the hydraulic motor together; and wherein the first axle shaft is journaled in the first case portion and the second axle is journaled in the second case portion.

The above mentioned and other novel features and objects of the invention, and the manner of attaining them, may be performed in various ways and will now be described by way of example with reference to the accompanying drawings.

BRIEF DESCRIPTION OF THE DRAWINGS

FIG. 3 is a sectioned view on line II—II of FIG. 2 showing the pump and motor configuration of the hydrostatic transmission in association with the radiator member housing portion and shaft-driven cooling fan.

FIG. 4 is a sectioned view on line II—II of FIG. 2 showing the left and right hand case portions and to which the assembly of FIG. 3 are combined with.

BRIEF DESCRIPTION OF THE INVENTION

Figure 1:
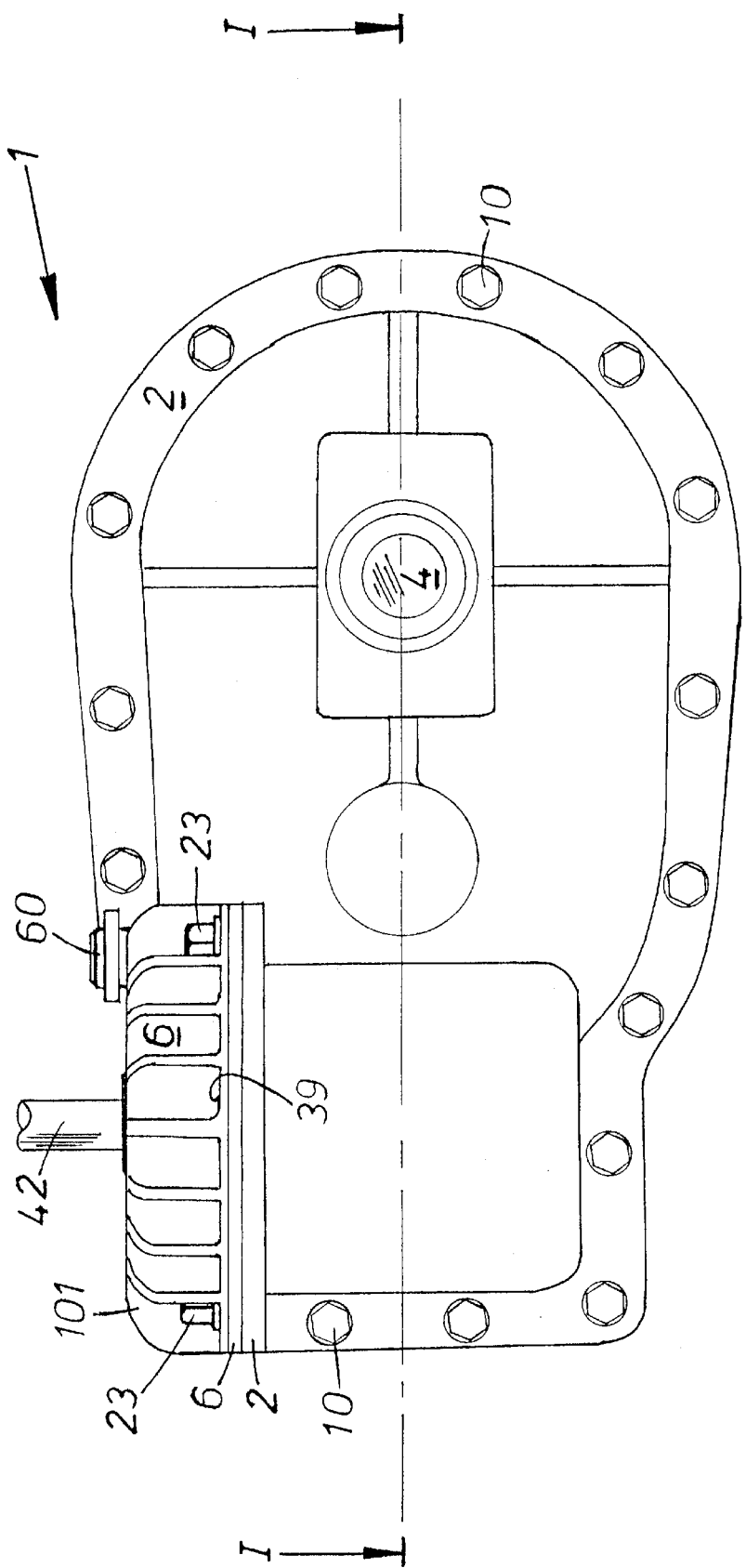
FIG. 1 is an external view from one side of the hydrostatic transaxle according to the invention.
Figure 2:
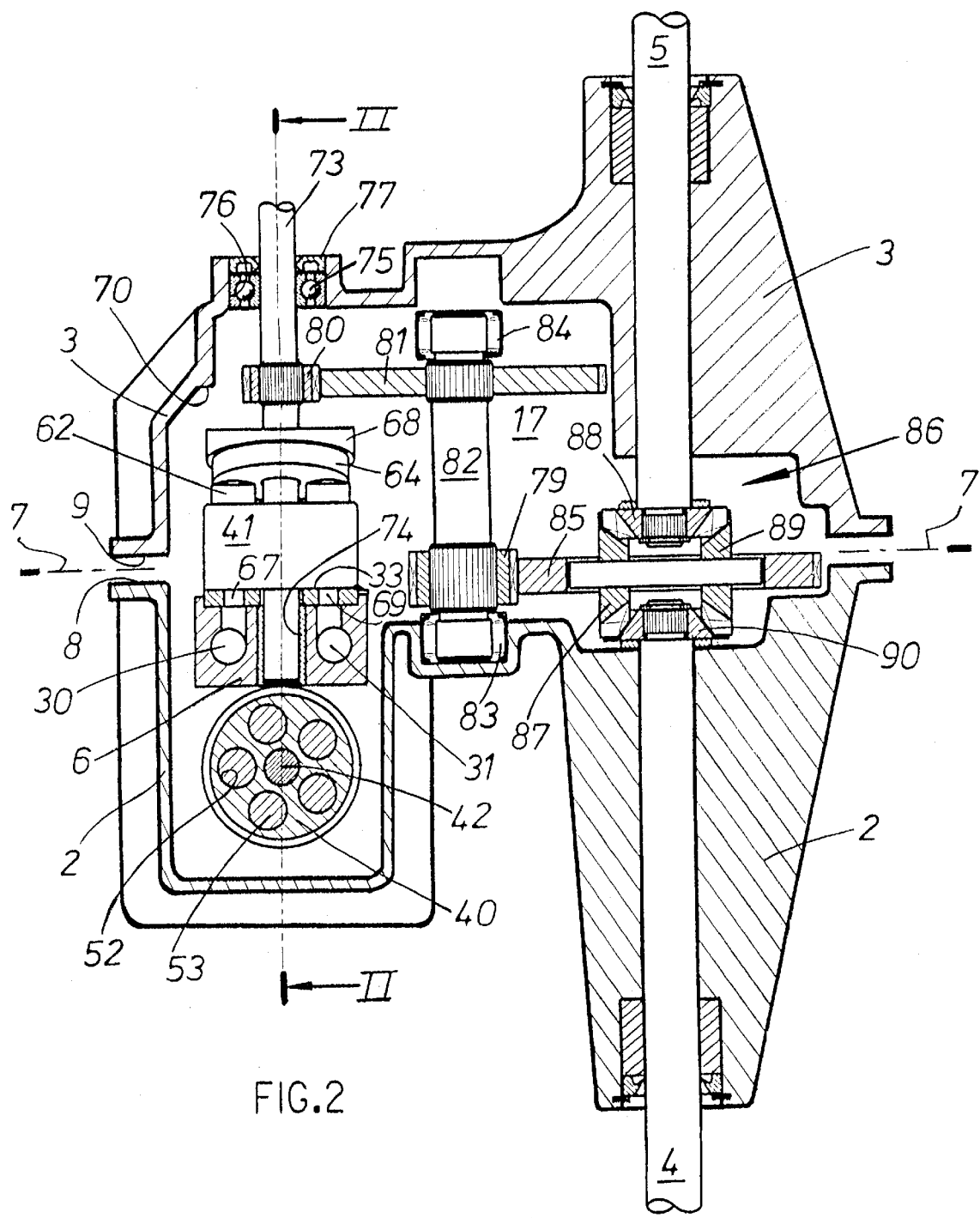
FIG. 2 is a plan view of the hydrostatic transaxle of FIG. 1 along the section line I—I and where the left and right case housing portions are shown separated.

The housing structure of the hydrostatic transaxle assembly which is depicted by arrow 1 that forms an integral part of the hydrostatic transmission may, in its simplest and most economic form be comprised of a first case portion 2 and a second case portion 3, each rotatably supporting a respective axle shaft 4, 5, as shown in FIG. 2 and a radiator member portion 6 which is connected to the exterior surface provided on either one or both first and second case portions 2, 3 as shown in FIG. 1.

The first and second case portions 2, 3 are joined together at their respective flanged junction surfaces shown in FIG. 2 as 8, 9 on the first parting-plane designated as 7. Although FIG. 2 does show case portions 2, 3 to be slightly apart in there separable state, this is just to demonstrate that the case portions 2, 3 join together on a plane set transverse to the longitudinal axis of axle shafts 4, 5. Likewise, a radiator member portion 6 is separable from either or both case portions 2, 3. The first parting-plane 7 is therefore arranged to be perpendicular to the longitudinal axes of the output axle shafts, 4, 5, and where a liquid gasket seal is applied at this housing interface ensure a leak-free joint, and where a plurality screws (shown as bolt heads 10 in FIG. 1) are used to lock first and second case portions 2, 3 together. As best seen in FIGS. 3 & 4, junction surface 15 on the upper exterior surface of case portion 2 has an opening 16 for the exposure of internal chamber 17. In this example of the invention, a junction surface 18 is also provided on the upper exterior surface of case portion 3 such that junction surfaces 15, 18 can combine with the junction surface 20 of radiator member portion 6 along the second parting-plane designated 22.

Radiator member portion 6 is thereby attached directly to the mounting lip on junction surfaces 15, 18 of case portions 2, 3 and secured in-place by a plurality of fastening screws 23. A seal ring or liquid gasket seal applied between junction surfaces 15, 18, 20 ensures a leak-free joint, between the radiator member portion 6 and the case portions 2, 3 such when all three housing elements 2, 3, 6 are attached together, they form the surrounding boundary for internal chamber 17 where the hydraulic pump, hydraulic motor, speed reducing gears and mechanical differential are located. Although internal chamber 17 may be divided into separate chambers for purposes of segregating the hydrostatic transmission from the mechanical gearing components (including a mechanical differential, when required), the embodiment here used to describe this invention has a common chamber for all such components.

Radiator member portion 6 may preferably be case as one-piece in either aluminium alloy or iron/steel. If the piece is cast as a pressure diecasting, many features can be detailed with sufficient accuracy such that many secondary machining operations can be thus avoided. To overcome porosity problems in the casting that might result in leakage from the internal fluid circuit, the whole casting or just that portion exposed to the outer environment can be impregnated which is a process often used by the industry for aluminium die-cast components.

That part of the radiator member portion 6 defined here as lying below the second parting-plane protrudes past opening 16 to extend into internal chamber 17. Radiator member portion 6 contains within its internal structure fluid power transmitting passages. As shown these are flow passages 29, 30 for the forward direction and return passage 31, and these passages 29, 30 and 31 form a closed-loop fluid circuit that connect together the respective fluid coupling surfaces 32, 33 otherwise known as valve-faces, between the pump and motor.

Check-valves are included in both forward flow and return passages, for instance, check-valve 35 is shown in forward passage 30 in FIG. 3. With a similar check-valve in return passage, the pair of check-valve allow the admittance of make-up fluid in either of the two passages 30, 31 in order that the hydrostatic transmission can recover any fluid loss during operation because of leakage.

The respective cylinder-barrels 40, 41 of the hydrostatic-transmission pump and motor are mounted perpendicular to one another such that the rotating axis of the pump cylinder-barrel 40 is co-axial with input-drive shaft 42 whereas the rotating axis of the motor cylinder-barrel 41 is parallel to the rotating axes of the axle-shafts 4, 5.

The radiator member portion 6 includes a central aperture 47 and a series of generally radial fins 101 projecting from the aperture 47 to substantially cover the exterior top surface 39 of the radiator member portion 6. At least one bearing 43 is located in the aperture as well as a rotary seal 46.

Input drive shaft 42 supported by bearing 43 extends completely through aperture 47 into internal chamber 17 to receive further support by means bearing 44 in case portion 2. Between bearings 43, 44, drive-shaft 42 is provided with a male spline 45 with is engages a complementary female hole spline in the cylinder-barrel 40. Although as shown, bearing 44 is located in blind hole 48 in case portion 2, this hole 48 could be designed as a "through-hole" in which case an additional rotary seal would be need to prevent fluid escaping from internal chamber 17. Surrounding hole 48 is a part-cylindrical seat 49 on which the tiltable swash-plate 51 of the pump is operatively connected to. Although hole 48 and part-cylindrical seat 49 are shown as being formed in the interior of case portion 2, it would be possible to incorporate such details in a subsidiary housing element which would then attached and be fixed to the interior of case portion 2. Alternatively, by providing a further opening in this area of case portion 2 would allow such a subsidiary housing element to be attached to the exterior of case portion 2 and where the details would protrude through such an opening.

The cylinder-barrel 40 of the pump is provided with a plurality of axial cylinder-bores 52, each bore 52 containing a respective piston 53 and where each piston 53 is being axially urged outwards by a spring (not shown) located behind the piston 53 in the bore 52. The outer end of the piston 53 is generally domed-shaped to be operatively connected to an adjacent operating surface 55 of swash-plate 50 by the bias produced by springs. The action of the springs behind each of the pistons 53 produces a counter reaction which loads the cylinder-barrel 40 against the fluid coupling surface 32 on radiator portion 6. Each cylinder-bore 52 has a port 57 so arranged to communicate in sequence with a pair of arcuate ports (not visible) in the fluid coupling surface 32 for connection to the fluid power transmitting passages 30, 31.

Swash-plate 50 is so arranged for the pump that its inclination angle can be varied in both directions from its neutral or zero-inclination point, the swash-plate 50 being able to tilt over part-cylindrical surface 49 and connected by linkages (not shown) to a control-shaft 60 which protrudes out from the radiator member 6 as shown in FIG. 1. Rotary movement of the control-shaft 60 causes the swash-plate 50 to incline in angle in respect of the stroking axis of the pistons 53, and thereby the stroke of the pistons 53 is changed. The amount of piston 53 stroke determines the amount of fluid displaced in the cylinder-bore 52 per each single rotation of the cylinder-barrel 40, and hence the swept volume of the pump can be changed by altering the amount of piston stroke so that the amount of fluid delivered to the hydraulic motor is precisely controlled.

The cylinder-barrel 41 of the motor is almost in all respects identical to that of the pump, and carries a series of pistons 62 which are operatively connected to the operational surface 63 of thrust plate 64. Each piston 62 is housed in its respective cylinder-bore 65 provided within cylinder-barrel 41, and each cylinder-bore 65 has a port 66 so arranged to communicate in sequence with a pair of ports 67, 69 in the fluid coupling surface 33 for connection to the fluid power transmitting passages 30, 31.

Although not shown, a spring is positioned in each of the cylinder-bores 65 to engage with its respective piston 62. The thrust-plate 64 is here shown in its most often used position which is permanently inclined with respect of the axis of pistons 62. Thrust-plate 64 is supported on a insert 68 which once the hydrostatic transmission is assembled with the housing, contacts with support surface 70 provided in case portion 3. As the inclination angle of the thrust-plate 64 always remains at an angle during the operation of the device, the piston 62 stroke in the motor remains constant. As the fluid received by the motor from the pistons 53 of the pump can be changed by the action of using control-shaft 60 to tilt the swash-plate 50 in two directions, the rotational direction of the motor can therefore be in either direction. Fluid entering the cylinder bores 65 causes the pistons 62 to move axially outwards and because of their reaction on the operational surface 63 of thrust-plate 64, an angular driving moment is created on the cylinder-barrel 41 which is caused to revolve. The cylinder-barrel 41 of the motor is mechanically engaged by spline 72 to shaft 73 and thus rotation of the cylinder-barrel 41 causes rotation of shaft 73, and mechanical power is thereby transmitted through the speed reducing gears to the differential and axle output shafts 4, 5 of the hydrostatic transaxle 1 which in the case of a vehicle application such as a lawn tractor, are attached the drive wheels of the vehicle.

Shaft 73 is supported by bearings 74, 75, bearing 74 being located in the downwards extending portion of radiator member 6 whereas bearing 75 is located in hole 76 in case portion 3. Shaft 73 may protrude from the transaxle 1 so that a conventional disc parking brake can be attached. Rotary seal 77 positioned in hole 76 is also provided to surround shaft 73 in order to prevents fluid escaping internal chamber 17.

Gear 80 fixed to shaft 73 is in mesh with gear 81 fixed to intermediary-shaft 82 and where intermediary shaft 82 is supported by bearings 83, 84 in respective case portions 2, 3. Gear 79 fixed on intermediary shaft 82 meshes with the ring-gear 85 of the differential-assembly 86. As shown, ring gear 85 is positioned to intercept the first parting-plane 7 but it may also be positioned to lie adjacent to one side of the first parting-plane.

Differential-assembly 86 includes bevel gears shown as 87, 88, 89, 90 so that power can be transmitted from the ring gear 85 differential-assembly 86 to the axle-shafts 4, 5 of the transaxle 1 as known to those skilled in the art. The inclusion of a differential assembly is important as it allows normal differentiation between the left and right drive wheels of the vehicle and helps prevent lawn damage especially when tight turns are undertaken. However, there are applications where no such differentialled action is required, and in these instances, a single axle shaft may be used instead of the two as here shown. In the case of a single axle shaft, this shaft can be arranged to extent outwardly on one or both sides of the housing.

Figure 5:
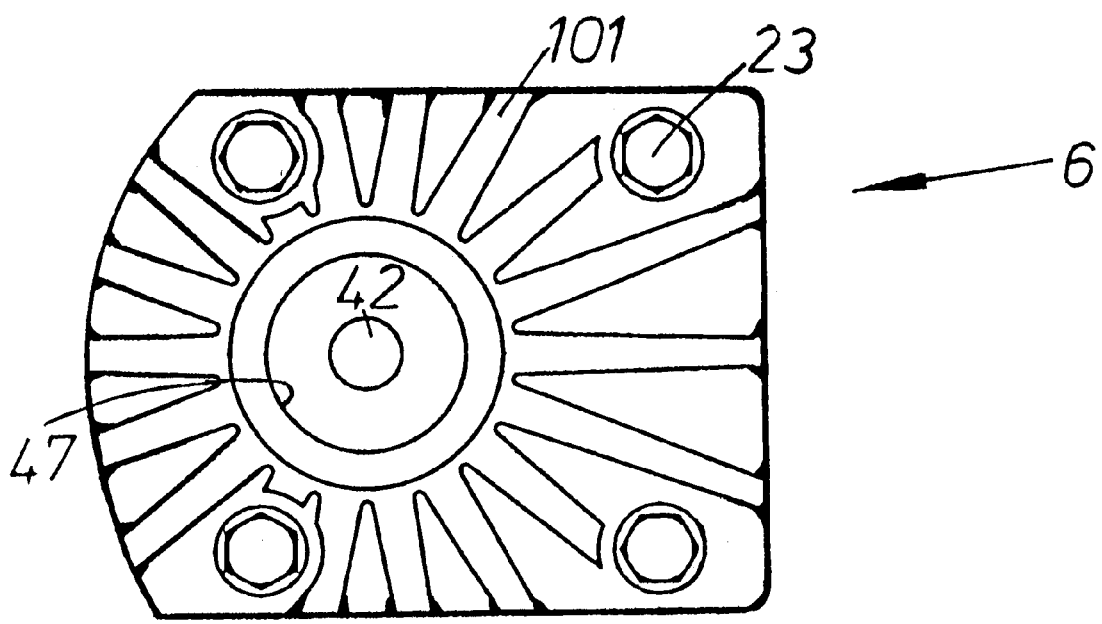
FIG. 5 is a plan view of the top of the radiator member housing portion of FIG. 3.

As shown in FIGS. 3 & 5, shaft-driven fan 99 positioned external to the housing to be directly above radiator member 6 is provided with a series of blades 100. The air blast produced by the rotating blades 100 cooling the radiator member 6 and in particular the series of fins 101 which project from the top surface 3, and heat is thereby extracted heat from the neighbouring fluid power transmitting passages 29, 30 and 31, a portion of which (29, 31) are in spaced relationship with the top surface 39. This arrangement provides far more effective cooling of the hydrostatic transmission than the prior art hydrostatic transaxles presently on the market which locate that component having such passages inside and not outside the surrounding housing.

By means of appropriate selection or adjustment of the inclination of the swash-plate 50 of the pump by means of the control-shaft 60 and the intermediary linkage, the hydrostatic transmission speed ratio is altered. Rotation of the input-shaft 42 causes cylinder-barrel 40 to rotate and results in reciprocation of pistons 53. Fluid is then delivered from passages 30 or 31 (depending on which direction of flow occurs from the pump) to enter the cylinder-barrel 41 of the motor and cause the pistons 62 to reciprocate in their respective bores 65 by way of their angle of attack against the inclined thrust-plate 64. The side force is created by the pistons 62 on the wall of each bore 65 in those bores subjected to pressurised fluid causes rotation of the motor cylinder-barrel 41 about its longitudinal or central axis of rotation. Cylinder-barrel 41 in turn rotates shaft 73 and mechanical power is transmitted through gears 80, 8, 79 to the ring gear 85 of the differential assembly 86. Bevel gearing 87, 88, 89, 90 in the differential assembly 86 then determines the respective speeds of the axle output shafts 4, 5 that drive the wheels of the vehicle.

Figure 6:
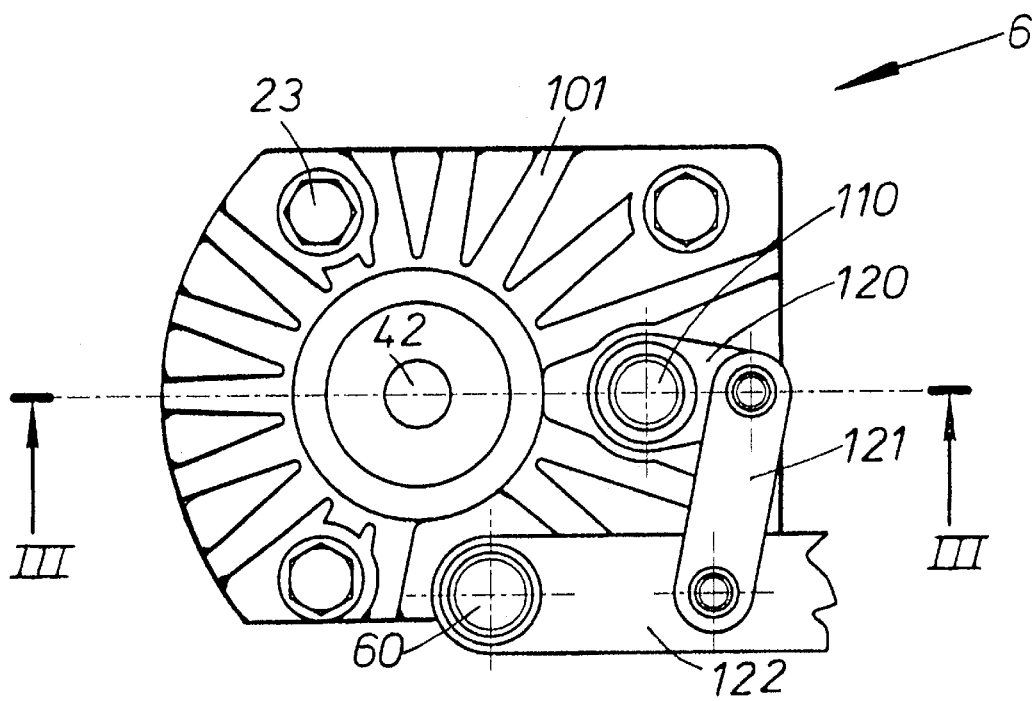
FIG. 6 is a plan view of the top of an alternative radiator member housing portion.
Figure 7:
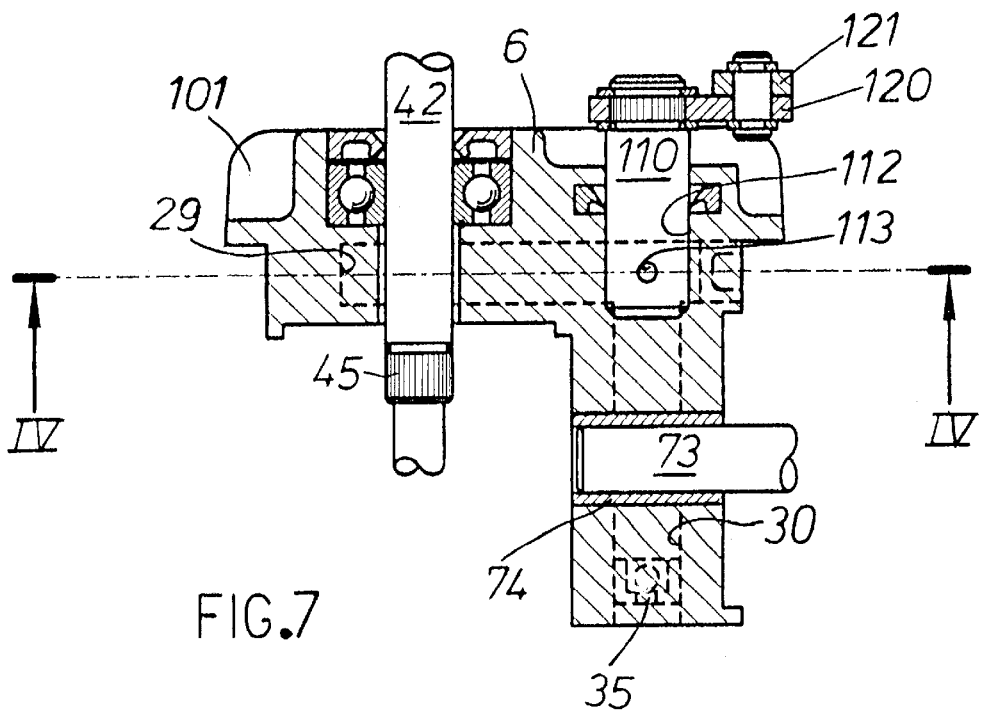
FIG. 7 is a part sectional view along line III—III of FIG. 6.
Figure 8:
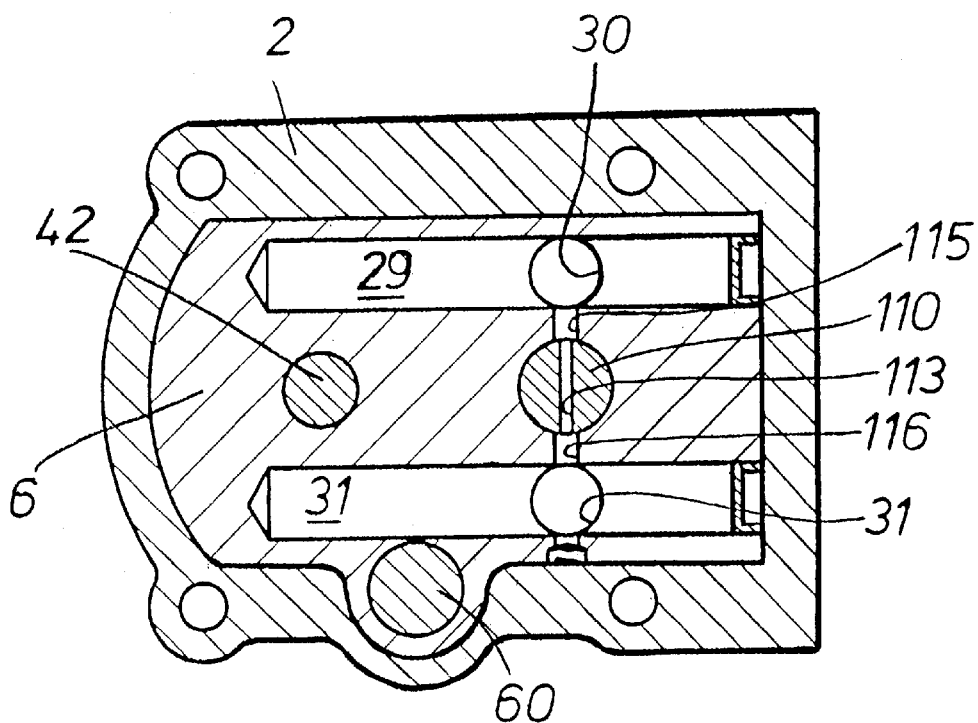
FIG. 8 is a section view along line IV—IV of FIG. 7.
Figure 9:
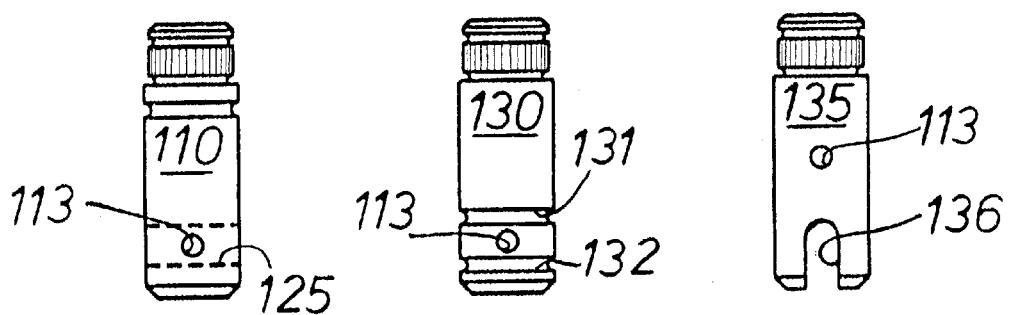
FIG. 9 depict various forms of fluid valves for use in the alternative housing construction.

FIGS. 6 to 9 are included to illustrate how it would be possible to incorporate other operational and sometimes desirable features, for instance amongst others, a simple "wide-band neutral" feature for the hydrostatic transmission within the radiator member portion of this invention. This being accomplished by including a rotary vent valve 110 in the radiator member 6, the valve 110 being journaled in bore 112 and provided with a fluid short-circuit shown as small passage 113 which, when the swash-plate of the pump is near its zero inclination angle, passage 113 can connect with two passages shown as 115, 116 which are in communication with fluid passages 30 and 31, respectively. As shown, any fluid released by the pump when the swash-plate has a small inclination angle can divert through passage 113 rather than flow to the hydraulic motor where it would act in causing the motor assembly to rotate. FIG. 6 shows valve 110 linked to control-shaft 60 by means of linkages 120, 121, 122 so that the movement in position of passage 113 occurs as control-shaft 60 is moved by the operator of the vehicle. By varying in the span or arm length of the linkages, it is possible to obtain varying characteristics from the "wider band neutral" to suit each particular application. Valve 110 shown as the left-hand illustration in FIG. 9 also includes a hidden passage shown by dotted line 125, passage 125 being positioned perpendicular to passage 113. Disconnection of linkage 120 from valve 110 would allow the valve 110 to be manually rotated through ninety degrees to provide a large flow short-circuit between passages 115, 116 as hidden passage 125 becomes a short-circuit for the fluid. The valve shown as 130 in FIG. 9 shows a slight modification whereby grooves 131, 132 are provided for "O" ring type seals that surround passage 113. The valve shown as 135 in FIG. 9 shows a further modification whereby the valve can be axially lifted so that passage 113 is no-longer in connection with passages 115, 116, so that once placed in this lifted position, slot 136 is open to passages 115, 116 to short-circuit fluid into internal chamber 17. Thus the degree of flow restriction caused by fluid having to pass through the restricted passage 113 is overridden, and the vehicle can be easy pushed without having to first start the engine. A further advantage of having the vent valve in the housing element is that adjustments to the operating condition of the hydrostatic transaxle can be made without disassembly of the entire unit. Depending on what is required, the hydrostatic transaxle axle assembly of this invention can include a "wider band neutral" effect as well as a "freewheel" or fluid dumping feature.

Although axial piston swash-plate units are used to illustrate and describe this invention, for certain applications, there may be advantage in substituting the fixed-displacement axial piston swash-plate hydraulic motor with that of another type. For instance, a fixed-displacement external geared hydraulic motor could be used instead and where the gears of the motor in this instance would be journaled in bores provided in the same housing member containing the fluid passages linking the pump to the motor and fed with fluid by a fluid coupling surface provided in such bores. Alternatively, a variable-displacement vane pump could be used in place of the axial piston swash-plate pump and a fixed-displacement vane motor used in place of the axial piston swash-plate motor.

A charge and/or power take-off auxiliary pump, preferably of the gerotor internal gear type may also be disposed in the same housing member that contains the fluid passages linking the pump to the motor of the hydrostatic transmission. The gerotor pump being driven by the input drive shaft and having fluid passages and valves arranged in the same housing member to suit the needs of the application. A further advantages in this arrangement would allow the pressure setting of the gerotor pump to be adjusted easily as the pressure relief-valve would have an external adjustment; the fan cooling effect of the present invention would help keep the fluid delivered by the gerotor pump to be kept as cool as possible; all the external connections can be arranged to be near the top of the transaxle thereby minimising the changes of being damaged.

The invention may further be adapted by the use of shortened shafts 42, 73. For instance, input drive-shaft 42 could be supported by two bearings in the radiator member portion 6 and stop short just past the spline drive 45 to the cylinder-barrel 40 of the pump. Similarly, shaft 73 could be supported on bearings on each side of gear 80 and stop short just past the spline drive 72 to the cylinder-barrel 41 of the motor.

As shown in the embodiment used to describe and illustrate this invention, opening 16 exists only in case portion 2. However, it would nonetheless be within the scope of this invention to extend the opening across the first parting-plane so that both case portions 2, 3 would each provide a portion of the necessary opening through which the radiator member portion would extend through. Furthermore, the opening 16 in case portion 2 does not necessarily need to extend to meet the junction surface 8 as shown but may be arranged to stop short of the junction surface 8 so that the junction surface 15 would completely surround the opening. Although as described above, the radiator member portion 6 is connected to the exterior mounting surface provided in case portions 2, 3, alternatively, the radiator member could be mounted to an interior surface provided in one or both case portions. In this case, the part of the radiator member having the fins projecting from the central aperture would extend from the interior of the device through the opening and thereby be exposed to the downward draught from the shaft driven cooling fan.

As the present invention will still allow some of the heat to be transferred out from the transaxle by conduction through the hydraulic fluid medium to the outer housing in a similar manner as used in the prior art devices, the total cooling effect is enhanced because the most important area to be cooled, namely the fluid path between pump and motor, is directly adjacent that portion in the housing on which the cooling fan is most effective. Consequently, the hydrostatic transaxle can be operated for longer periods at rated loads with less risk of overheating the power transmission fluid.

In accordance with the patent statutes, we have described the principles of construction and operation of our invention, and while we have endeavoured to set forth the best embodiment thereof, we desire to have it understood that obvious changes may be made within the scope of the following claims without departing from the spirit of our invention.

We claim:

1. An axle assembly comprising a housing having an internal chamber for an internally disposed hydrostatic transmission and forming an integral part of said hydrostatic transmission, said hydrostatic transmission comprising a variable-displacement hydraulic pump and a fixed-displacement hydraulic motor; speed reducing gearing in said housing and drivingly connected to said hydraulic motor; first and second axle shafts rotatably supported in said housing and a mechanical differential disposed within said housing, said differential drivingly connected between said speed reducing gearing and said axle shafts; said housing comprising first and second case portions joined together along a first parting-plane disposed perpendicular to the longitudinal axes of said axle shafts and a radiator member portion connectable about an opening provided in at least one of said first and second case portions along a second parting-plane disposed parallel and offset with respect to the longitudinal axes of said axle shafts; said radiator member portion containing within its internal structure fluid power transmitting passages for connecting said hydraulic pump and said hydraulic motor together, and wherein the first axle shaft is journaled in the first case portion and the second axle shaft is journaled in the second case portion.

2. An axle assembly according to claim 1 wherein a portion of said fluid power transmitting passages are arranged to lie close to the exterior top surface of said radiator member portion.

3. An axle assembly according to claim 2 and including an input drive-shaft rotatably supported in said radiator member portion and extending into said chamber to be drivingly connected to said hydraulic pump, a cooling fan disposed on said input drive-shaft external to said housing and where said fan is provided with a plurality of blades for the movement of air in the general direction of said fluid power transmitting passages.

4. An axle assembly according to claim 3 wherein the axis of rotation of said hydraulic pump is parallel with respect to said first parting plane, and where the axis of rotation of said hydraulic motor is parallel with respect to said second parting plane, and wherein said radiator member portion further includes fluid coupling surfaces on that part extending through said opening into said internal chamber to which said hydraulic pump and said hydraulic motor are operatively engaged to respectively.

5. An axle assembly according to claim 4 wherein said hydraulic pump is of the axial piston type having a tiltable swash-plate, said swash-plate being disposed in said housing directly opposite said opening.

6. An axle assembly according to claim 1 wherein said radiator member portion includes an aperture and a plurality of generally radial fins projecting from said aperture to substantially cover said exterior top surface; at least one bearing and rotary seal disposed in said aperture and an input drive-shaft rotatably supported in said at least one bearing and arranged to extend into said chamber to be drivingly connected to said hydraulic pump; a fan disposed on said input drive-shaft external to said housing, said fan including a plurality of blades for producing an axial flow of air in the general direction of said fins when said input drive-shaft is caused to rotate.

7. An axle assembly according to claim 6 wherein a portion of said fluid power transmitting passages are arranged to be in spaced relationship with said exterior top surface so to lie closely adjacent said fan and where said fins lie under the path of said air flow from said fan provide means for increasing the heat dissipated from said hydrostatic transmission.

8. An axle assembly according to claim 7 wherein said radiator member portion is formed with fluid coupling surfaces over that part extending through said opening into said internal chamber and to which said pump and said motor are engaged to respectively.

9. An axle assembly according to claim 8 wherein said hydraulic pump is of the axial piston type having a tiltable swash-plate, said swash-plate being disposed in said housing directly opposite said opening.

10. An axle assembly according to claim 1 wherein said radiator member portion includes an aperture and a raised exterior surface comprising a plurality of generally radial fins projecting from said aperture; at least one bearing and rotary seal disposed in said aperture and an input drive-shaft rotatably supported in said at least one bearing and arranged to extend into said chamber to be drivingly connected to said hydraulic pump; a fan disposed on said input drive-shaft external to said housing, said fan including a plurality of blades for producing an axial flow of air in the general direction of said fins when said input drive-shaft is caused to rotate.

11. An axle assembly according to claim 10 wherein said fluid power transmitting passages are arranged to be in spaced relationship with said exterior surface, and where a portion of said fluid power transmitting passages are arranged to lie closely adjacent said fan and where said fins lie under the path of said air flow from said fan to provide means for increasing the heat dissipated from said hydrostatic transmission.

12. An axle assembly according to claim 11 wherein said radiator member portion is formed with fluid coupling surfaces over that part extending through said opening into said internal chamber and to which said pump and said motor are engaged to respectively.

13. An axle assembly according to claim 12 wherein said hydraulic pump is of the axial piston type having a tiltable swash-plate, said swash-plate being disposed in said housing directly opposite said opening.

14. An axle assembly according to claim 2 wherein said hydraulic pump is of the axial piston type having a tiltable swash-plate and where said swash-plate is disposed in said housing directly opposite said opening; said radiator member portion further includes first and second fluid coupling surfaces on that part extending through said opening into said internal chamber and said fluid power transmitting passages are arranged to terminate in at least four ports such that a first pair of said ports are disposed on said first fluid coupling surface and a second pair of said ports are disposed on said second fluid coupling surface.

15. An axle assembly according to claim 1 wherein said radiator member portion is formed with an aperture, at least one bearing and rotary seal disposed in said aperture and an input drive-shaft rotatably supported in said at least one bearing and arranged to extend into said chamber to be drivingly connected to said hydraulic pump, said radiator member portion being further formed with fluid coupling surfaces on that part extending through said opening into said internal chamber and to which said pump and said motor are engaged to respectively; and where a fan disposed on said input drive-shaft external to said housing provides means for the removal of heat from said fluid power transmitting passages within said radiator member portion.

16. An axle assembly according to claim 15 wherein said hydraulic pump is of the axial piston type having a tiltable swash-plate, said swash-plate being disposed in said housing directly opposite said opening.

17. An axle assembly according to claim 1 wherein said hydraulic pump is of the axial piston type having a tiltable swash-plate, said swash-plate being disposed in said housing directly opposite said opening, and where said radiator member provides first and second fluid coupling surfaces for said hydraulic pump and said hydraulic motor respectively, bearing means provided in said radiator member for the support of said input drive shaft and where a cylinder-barrel containing a plurality of pistons of said hydraulic pump is arranged to be driven by said input drive-shaft and operatively connected to the first fluid coupling surface, said fluid power transmitting passages within said radiator member connecting first and second fluid coupling surfaces together and where the second fluid coupling surface is operatively connected for a further cylinder-barrel acting as a component of said hydraulic motor.

18. An axle assembly according to claim 1 wherein a vent valve is included within said radiator member portion, said vent valve when fully activated causing said fluid power transmitting passages to short-circuit thereby interrupting the fluid connection between said hydraulic pump and said hydraulic motor.

19. An axle assembly according to claim 18 where a control shaft is supported in said radiator member portion, said control shaft being operatively connected to said hydraulic pump as well as being operatively connected to said vent valve for an enhanced wide-band neutral effect for said hydrostatic transmission.

20. An axle assembly according to claim 1 wherein said hydraulic pump is of the axial piston type having a tiltable swash-plate, said swash-plate being disposed in said housing directly opposite said opening; a control shaft is supported in said radiator member portion and operatively connected to said tiltable swash-plate.

21. An axle assembly according to claim 1 wherein said second parting plane is arranged to be on the outer exterior surface of those said case portions having a said opening.

22. An axle assembly according to claim 1 wherein said second parting plane is arranged to be on the inner interior surface of those said case portions having a said opening.

23. An axle assembly according to claim 1 wherein said hydraulic pump is of the axial piston type having a tiltable swash-plate, said swash-plate being disposed in said housing directly opposite said opening, wherein said hydraulic pump includes a cylinder-barrel containing a plurality of cylinders each containing a piston and where said cylinder-barrel is operatively connected to said first fluid coupling surface whereas the second fluid coupling surface is operatively connected to a further cylinder-barrel acting as a component of said hydraulic motor.

24. An axle assembly comprising a housing having an internal chamber for an internally disposed hydrostatic transmission and forming an integral part of said hydrostatic transmission, said hydrostatic transmission comprising a variable-displacement, hydraulic pump and a fixed-displacement hydraulic motor; speed reducing gearing in said housing and drivingly connected to said hydraulic motor; a pair of axle shafts rotatably supported in said housing and a mechanical differential disposed within said housing, said differential drivingly connected between said speed reducing gearing and said pair of axle shafts; said housing being defined by three main housing elements and where two of said housing elements each supporting one of said pair of axle shafts are arranged to be joined together along a parting plane disposed perpendicular to the longitudinal axes of said pair of axle shafts; and wherein one of said two housing elements is provided with an opening for allowing a portion of the remaining housing element to extend through and where that housing element having structure fluid power transmitting passages for connecting said hydraulic pump to said hydraulic motor together.

25. An axle assembly according to claim 24 wherein said hydraulic pump is of the axial piston type having a tiltable swash-plate, said swash-plate being disposed in said housing directly opposite said opening.

26. An axle assembly comprising a surrounding housing structure providing an internal chamber for an internally disposed hydrostatic transmission and forming an integral part of said hydrostatic transmission, said hydrostatic transmission comprising a variable-displacement swash-plate hydraulic piston pump and a fixed-displacement hydraulic motor; speed reducing gearing disposed within said chamber and drivingly connected to said fixed-displacement hydraulic motor; a power output connection in the form of a pair of axle shafts rotatably supported in said housing and projecting from said housing; a mechanical differential disposed within said chamber and drivingly connected between said speed reducing gearing and said pair of axle shafts; said housing being defined by at least three separable elements of said axle assembly of which at least one includes within its internal structure a plurality of fluid power transmitting passages and an exterior heat radiating surface and where a portion of said fluid power transmitting passages lie directly adjacent to said heat radiating surface, and where two other of said at least three separable elements are each to support a respective one of said pair of axle shafts and arranged to separate about a first parting-plane disposed generally transverse to the longitudinal axes of said pair of axle shafts; a power input connection in the form of an input drive-shaft rotatably supported in said housing and projecting from said housing, said input drive-shaft extending inwardly to pass through that separable element provided with said fluid power transmitting passages and an exterior heat radiating surface to enter said chamber for drivingly connecting with said variable-displacement swash-plate hydraulic piston pump; a cooling fan disposed on said input drive-shaft external to said housing and including a plurality of blades such that during rotation of said input drive-shaft a draught of cooling air is imparted from said cooling fan towards said separable element provided with fluid power transmitting passages and an exterior heat radiating surface as well as adjoining separable elements of said axle assembly.

27. An axle assembly according to claim 26 wherein said variable-displacement swash-plate hydraulic piston pump includes a cylinder-barrel and where said separable element provided with fluid power transmitting passages and an exterior heat radiating surface includes a valve face, said valve face to lie adjacent to said cylinder-barrel to provide a means for the transfer of fluid between said cylinder-barrel and said fluid power transmitting passages whereby said valve face and said cylinder-barrel interface with each other along a surface of co-operation disposed perpendicular to said first parting-plane.

28. An axle assembly according to claim 27 wherein the swash-plate of said variable-displacement swash-plate hydraulic piston pump is located on the opposite side in said housing to that said separable element provided with fluid power transmitting passages and an exterior heat radiating surface such that said cylinder-barrel can be said to reside in a location between said swash-plate on the one hand and said cooling fan on the other hand.

29. An axle assembly according to claim 28 wherein said separable element provided with fluid power transmitting passages and an exterior heat radiating surface is joined to at least one other of said at least three separable elements along a second parting-plane and where said second parting-plane is disposed perpendicular to said first parting-plane.

30. An axle assembly according to claim 29 wherein said fixed-displacement hydraulic motor is of the axial piston swash-plate type and is arranged that its axis of rotation is disposed parallel and offset with respect to said second parting-plane.

* * * * *

UNITED STATES PATENT AND TRADEMARK OFFICE
CERTIFICATE OF CORRECTION

PATENT NO. : 6,231,466 B1
DATED : May 15, 2001
INVENTOR(S) : Thoma et al.

It is certified that error appears in the above-identified patent and that said Letters Patent is hereby corrected as shown below:

Column 2,
Line 61, change "host" to -- hot --.
Line 65, change "conductive" to -- conducive --.

Column 5,
Line 44, change "case" to -- cast --.

Column 13,
Line 18, before "structure" insert -- the extending portion contains within its internal --.

Signed and Sealed this

Eighth Day of January, 2002

Attest:

JAMES E. ROGAN
Attesting Officer    Director of the United States Patent and Trademark Office